United States Patent [19]

Huber

[11] Patent Number: 4,626,982

[45] Date of Patent: Dec. 2, 1986

[54] SERIES CONNECTED SWITCHING POWER SUPPLY CIRCUIT

[75] Inventor: Paul G. Huber, West Warwick, R.I.

[73] Assignee: General Electric Company, Schenectady, N.Y.

[21] Appl. No.: 831,105

[22] Filed: Feb. 18, 1986

Related U.S. Application Data

[63] Continuation of Ser. No. 548,120, Nov. 2, 1983, abandoned.

[51] Int. Cl.[4] ........................................... H02M 7/25
[52] U.S. Cl. ...................................... 363/80; 363/81; 363/89; 363/63; 323/266; 323/271; 323/284
[58] Field of Search ............... 323/266, 267, 268, 271, 323/282, 284, 288, 290, 270; 363/63, 70, 74, 78, 80, 81, 86, 89, 142

[56] References Cited

U.S. PATENT DOCUMENTS

| | | | |
|---|---|---|---|
| 3,416,066 | 12/1968 | Bourreau et al. | 323/350 |
| 3,675,116 | 7/1972 | Israel | 323/271 |
| 3,790,878 | 2/1974 | Brokaw | 323/267 |
| 3,914,617 | 10/1975 | Corbel | 323/266 |
| 4,034,232 | 7/1977 | LaVenture | 323/267 |
| 4,127,895 | 11/1978 | Krueger | 363/86 |
| 4,128,867 | 12/1978 | Heyman | 363/37 |
| 4,331,914 | 5/1982 | Huber | 323/324 |
| 4,333,138 | 6/1982 | Huber | 363/89 |
| 4,367,414 | 1/1983 | Miller | 307/38 |
| 4,380,729 | 4/1983 | Kaku et al. | 323/290 |

FOREIGN PATENT DOCUMENTS

0057319 4/1982 Japan ............................ 323/270

OTHER PUBLICATIONS

"The Voltage Regulator Handbook", J. D. Spencer, 1977, pp. 23-28.
"Cascaded Regulators Prevent Pass Transistor's Burnout", Tocci, Sep. 13, 1979/Electronics, pp. 148-149.

*Primary Examiner*—Peter S. Wong
*Assistant Examiner*—Jeffery Sterrett
*Attorney, Agent, or Firm*—Nathan D. Herkamp; Philip L. Schlamp; Fred Jacob

[57] ABSTRACT

A power supply for providing multiple operating potentials to a load switching controller is capable of providing constant voltage d.c. outputs from any of a plurality of a.c. voltage sources including the full range of power supply voltages and frequencies commonly used in various geographic locations throughout the world. The power switching element on-time is controlled by sensing the output voltage levels and providing feedback control of the switching element. A status circuit provides an indication of either an overvoltage of an undervoltage condition.

16 Claims, 1 Drawing Figure

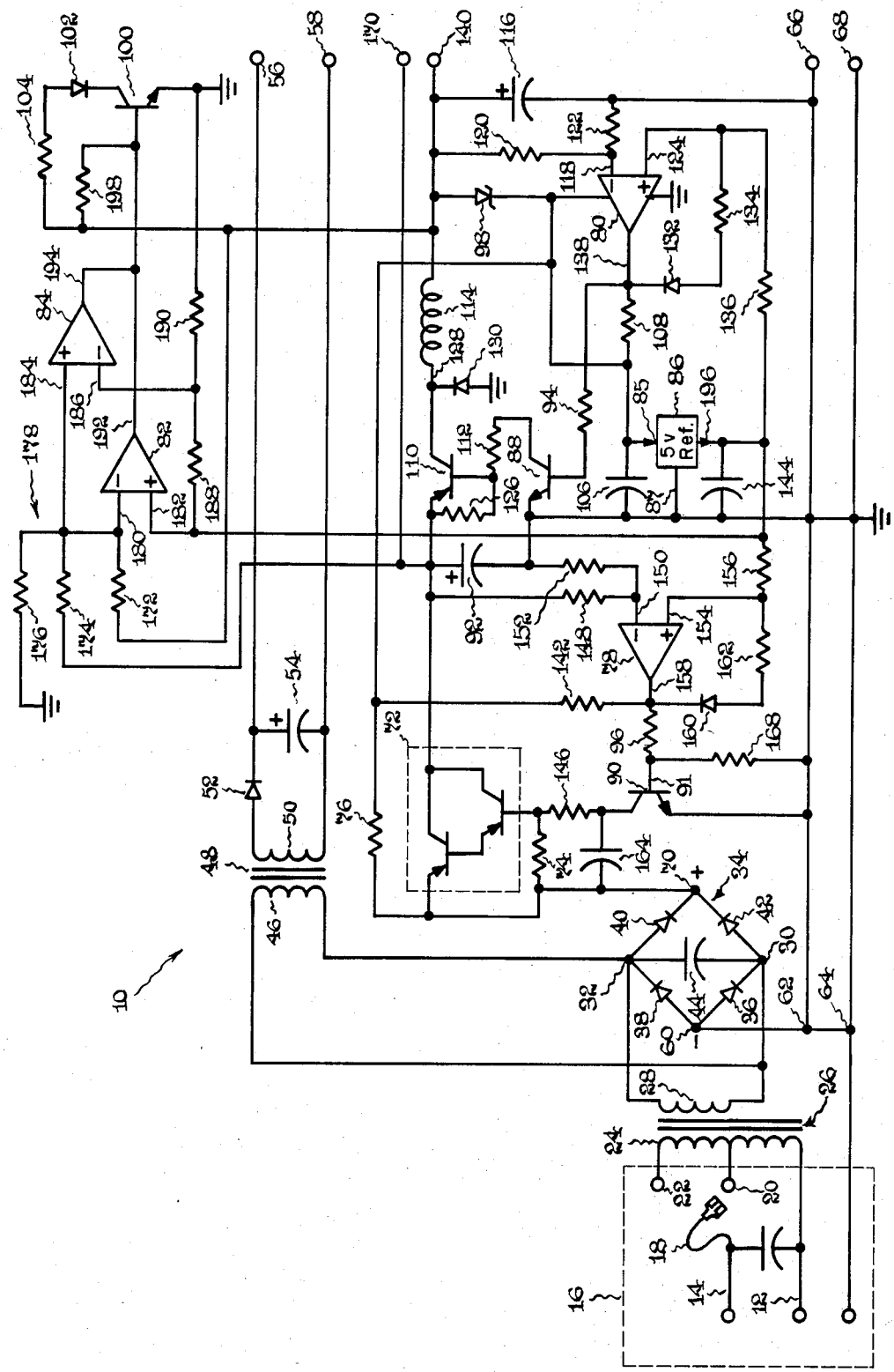

SERIES CONNECTED SWITCHING POWER SUPPLY CIRCUIT

This application is a continuation of application Ser. No. 548,120 filed Nov. 2, 1983, now abandoned.

BACKGROUND OF THE INVENTION

This invention relates to switching power supply apparatus, and, more particularly, to a low cost power supply capable of accommodating a wide range of input voltage and frequency for use in remotely located programmable load control panels.

DESCRIPTION OF THE PRIOR ART

A system for remotely controlling electrical loads distributed over a wide area, such as a large office building or factory, from a microprocessor-based central controller is disclosed in U.S. Pat. No. 4,367,414—Miller et al, issued Jan. 4, 1983. The information disclosed in that patent is incorporated herein by reference thereto as if fully set forth herein. The Miller '414 patent states in columns 29-30 that a 20-40 volt switchleg power supply is required and that a combination of resistors is used to provide the 3.5-5 volts power required for the logic circuits. The present invention provides a power supply system to provide a plurality of d.c. voltages for logic and switchleg circuits. Power distribution systems in various locations throughout the world deliver power with a voltage ranging from 100 to 347 volts and with a frequency ranging from 50 to 100 hertz. A power supply system capable of operating successfully with any of the available voltage and frequency sources can avoid the need to provide a multiplicity of products in order to accommodate each of the available power systems.

A power supply circuit for providing operating potential to a load switching controller is disclosed in U.S. Pat. No. 4,333,138 issued to the present inventor on June 1, 1982 and assigned to the present assignee. The '138 patent discloses a power supply circuit in which an output capacitor is charged during a single polarity half-cycle of the source until a predetermined voltage level is reached, at which point the charging is cut off. This power supply circuit is capable of delivering a constant voltage output from an a.c. power source.

A system for controlling distributed loads including an arrangement for sensing remote binary inputs as disclosed in U.S. patent application Ser. No. 548,110, filed Nov. 2, 1983 by Robert M. Beatty et al., a remote load control relay processor as disclosed in U.S. patent application Ser. No. 547,619, filed, Nov. 1, 1983 by Robert M. Beatty et al. and employing a method of queued access of a common communications link as disclosed in U.S. patent application Ser. No. 547,935 filed Nov. 2, 1983 by Edward B. Miller et al and assigned to the present assignee requires a power supply system able to accommodate a wide range of available a.c. power systems and able to provide more than one d.c. output voltage level. The above-identified patent application Ser. Nos. 548,110, 547,619 and 547,935 are incorporated herein by reference thereto. The present invention provides a single power supply having the capability to accommodate the range of power system voltages and frequencies used commonly in various locations throughout the world and to provide a plurality of constant d.c. outputs.

The prior art in power supplies includes many types of systems with a wide variety of performance characteristics. One prior art approach of accepting a wide range of power inputs is to use a transformer having a multiplicity (greater than 2) of primary and/or secondary taps. A multi-tap transformer is quite costly and its complexity requires that users be trained to recognize the requirements of proper use. Another approach is to use a dedicated transformer for each voltage and frequency combination to be served. This requires manufacturing and stocking a large variety of products in order to meet a world market. A single power supply of the present invention capable of accommodating the full range of power supply input voltages and frequencies can provide significant economies over either supplying a separate power supply for each voltage and frequency input or using a multi-tap transformer.

Prior art switching power supplies are generally fixed within 10-20% of a given power distribution, and are capable of delivering in excess of 200 watts. Prior art switching power supplies are used primarily to reduce power dissipation and size and are not directed to handling a plurality of input voltages and frequencies. The prior art switching power supplies operate on one of three modes: fixed on-time, fixed off-time or fixed frequency. The switching action of the switching element within the switching power supply is employed to provide the on-time, off-time or fixed frequency required. This typically requires an oscillator and timing circuit to be included in the switching power supply. Furthermore, the prior art switching power supplies on the market require minimum loads with minimum switching frequency and minimum duty cycle to insure safe operating conditions. This minimum load is often a significant fraction of the full load rating of the power supply varying typically between 10% and 50%, thereby limiting design flexibility.

SUMMARY OF THE INVENTION

Accordingly, an object of the present invention is to provide a power supply capable of accommodating a wide range of input voltages and frequencies. A further object of the present invention is to provide a switching power supply for providing a plurality of predetermined d.c. voltage outputs from a wide range of a.c. inputs. A still further object of the present invention is to control the turn-on and turn-off times of a peak voltage controlled switching element in conjunction with a transformer impedance characteristic to allow the conversion of a wide input voltage and frequency to a fixed ripple d.c. output.

Accordingly, the present invention includes an input transformer for connecting any one of a plurality of input power systems having a wide range of voltage and frequency characteristics to the switching power supply, two power switching stages having separate outputs, a halfwave rectified, isolated, filtered power supply stage having a distinct output and one monitoring stage with a power supply status indicator.

BRIEF DESCRIPTION OF THE DRAWINGS

Further objects and advantages of the present invention together with its organization, method of operation and best mode contemplated may best be understood by reference to the following description taken in conjunction with the accompanying drawings, in which like reference characters refer to like elements throughout, and in which the single figure is a schematic circuit diagram illustrating the switching power supply of the present invention.

DESCRIPTION OF THE PREFERRED EMBODIMENTS

In the single FIGURE, switching power supply 10 is illustrated schematically. Input power is supplied by lines 12 and 14 on connector board 16 and jumper 18 is connected either to terminal 20 or terminal 22 to supply power to the primary winding 24 of input transformer 26. Each terminal can accept an input voltage range in which the maximum voltage is at least twice the minimum voltage. For example, in a particularly preferred embodiment terminal 20 is available for 70–140 volts a.c. inputs, and terminal 22 is available for 200–416 volts a.c. inputs with a frequency range of 45 to 400 hertz. Secondary winding 28 is connected to terminals 30 and 32 of bridge circuit 34 comprising diodes 36, 38, 40 and 42 and capacitor 44. Also connected to terminals 30 and 32 is the primary winding 46 of transformer 48. The secondary winding 50 of transformer 48 is connected to diode 52 and filter capacitor 54 to provide a d.c. output at terminals 56 and 58 of from 5 to 11.5 volts for an isolated d.c. power supply.

The negative output terminal 60 of the bridge 34 is connected to the junction 62 and ground connection 64 which are connected to respective output terminals 66 and 68. The output from the bridge terminal 70 is brought to transistor switch 72 (shown as a Darlington transistor arrangement) which is cut off by resistor 74 across the base emitter junction. Current flows through the resistor 76, a soft start resistor, to power the comparators 78, 80, 82 and 84, the 5-volt reference 86, for example, a 78L05 three terminal voltage regulator sold by National Semiconductor, and the transistors 88 and 90. The soft start resistor 76 protects transistor switch 72 by limiting the current drawn during start-up needed, in particular, to charge capacitor 92 used as a regulator charge storage device. Furthermore, capacitors 106 and 144 aid in limiting current at power-up to a safe level to protect the transistors 88 and 90. The voltage on the line through resistor 76 is kept to safe operating levels by current drawn from comparator 80, reference 86, transistor 88 through resistor 94, and transistor 90 through resistor 96. Clamping zener diode 98 limits the absolute maximum voltage on the line to less than 15 volts through the 9-volt line load. The soft start is thereby achieved by the controlled charging of capacitor 106 which controls the base drive of transistor 90 through the RC combination of resistor 76 and capacitor 106 which in turn controls transistor 72 and its charging of capacitor 92.

The power supplied by resistor 76 flows through resistors 108 and 94 turning on transistor 88. This turns on the pass transistor 110 through resistor 112. Current is delivered through inductor 114 to capacitor 116 until the voltage on capacitor 116 exceeds approximately 8¾ volts. At this point, the voltage, as seen by the comparator 80 on its inverting input pin 118, is the voltage to the 8½ volt line divided by the combination of resistors 120 and 122. When this voltage exceeds 5 volts which is the reference voltage on pin 124, the output of comparator 80 goes low (below the turn-on threshold of transistor 88) and sinks base drive away from transistor 88 shutting transistor 88 off. This in turn shuts off transistor 110 very rapidly through the resistor 126. Inductor 114 then bucks the resulting change in current, the DI/DT, and the voltage on the side 128 of inductor 114 adjacent the transistor 110 attempts to go very much negative in an attempt to keep current conducting. Diode 130 then turns on and continues to charge capacitor 116 through inductor 114. Thus this section of the switching power supply uses the inductor as a charge storage device.

Hysteresis and, therefore, the ripple voltage in this section are controlled by diode 132 and resistors 134 and 136. That is, the voltage which must be applied to change the state of the comparator is dependent upon the state of the comparator at the time a change occurs. This arrangement provides a 0.4 volt hysteresis at the output pin 138 of comparator 80 providing a 0.8 volt maximum ripple on the 8½ output line 140. Without hysteresis switching of the comparator output would always occur at the same voltage causing an undesirable oscillation of output. Zener diode 98 acts in two modes. If the current supplied by resistor 76 is less than 8½ volts after the supply starts, diode 98 conducts in the forward mode bringing the voltage up to approximately 8 volts. This ensures that a high enough voltage is applied at the input 85 of 5-volt reference 86 for a stable region of operation. This minimum voltage condition would occur, for example, when a low voltage is applied to the transformer 26 giving a minimum secondary voltage. When a high voltage is applied to the transformer 26 giving a high secondary voltage, resistor 76 will attempt to supply more than 13 volts to the comparator 80. When this occurs, zener diode 98 turns on clamping the voltage at approximately 13½ volts. This insures that the comparator 78 will be able to sink the current supplied by resistor 142. Capacitors 106 and 144 serve as the decoupling capacitors for the 5-volt reference 86, and terminal 87 is connected to system common output 66.

Therefore, the 8½ volt output supply utilizes a switching transistor 110 with inductive charge storage to achieve high power efficiency and low ripple, and allows a second stage of regulation to be applied to derive a 5-volt logic power supply. The switching regulator circuit operates in a fixed on-time mode at maximum loading of 300 milliamps at 8.1 volts d.c. The on-time, approximately 50 to 100 milliseconds, determines the amount of charge transferred through inductor 114 to the load terminal 140. Exceeding the fixed on-time could saturate the inductor 114 causing transistor 110 to dissipate the excess power and possibly damaging the transistor 110. Operation below full load will vary frequency and on-time according to load requirements. In general, the on-time is controlled due to loading and input power; the frequency of switching transistor 110 is not controlled and will self-adjust to the loading requirements. It will be noted that no oscillator circuit is required, because the switching action is totally controlled by the output voltage, thereby not requiring a minimum load.

In a particularly preferred embodiment of the present invention, a maximum load of 300 milliamps, 0.5 volt maximum ripple voltage, were selected for the low voltage output, and capacitor 116 was 220 microfarads with a discharge period of 367 microseconds. The total charge transfer in this time period is $110 \times 10^{-6}$ coulombs. If this circuit is operated in a fixed on-time mode with an on-time of 50 microseconds, the value of inductor 114 can be calculated as $$L = Vt/I$$

where $I = dQ/dT = 110 \times 10^{-6}/50 \times 10^{-6} = 2.2$ amps and V is the voltage differential between capacitor 116 and capacitor 92 of about 20 volts. In this specific example, inductor 114 must be $455 \times 10^{-6}$ henries and be capable of handling 2.2 amps peak.

In order to provide a high voltage stage which is required for the load controller as described above, power from resistor 76 is delivered to base 91 of transistor 90 through the combination of resistors 142 and 96, in which resistor 142 acts as a pull-up sourcing current resistor, and resistor 96 acts as a current-limiting resistor. The resistances of resistors 142 and 96 are chosen to insure proper drive to transistor 90 and the hysteresis of comparator 80 described above. The current supplied to base 91 turns transistor 90 on, which in turn turns transistor switch 72 on in a full saturation mode through resistor 146. Current is thus delivered to capacitor 92 building up the charge and voltage on the capacitor 92. The voltage on capacitor 92 is divided by the resistor combination 148, 152 and is sensed on negative input pin 150 of comparator 78. The positive input pin 154 of comparator 78 is connected to the reference voltage source output 196 through the resistor 156. The output from comparator 78 allows transistor switch 72 to be left on in a saturated mode until it has delivered enough charge to capacitor 92 that the voltage on capacitor 92 exceeds 36–40 volts. The voltage sensed on pin 150 is about 5 volts after being divided by the resistors 148, 152. When the voltage exceeds 36–40 volts, the comparator 78 shuts off, that is, its output on pin 158 goes low (below the turn-on threshold of transistor 90), turning off transistor 90 by shunting its base drive to ground. When transistor 90 turns off, it turns off transistor 72 through resistor 74. Resistor 168 ensures that the voltage on base 91 goes to 0.3 volt and therefore that transistor 90 turns off. Diode 160 and resistor 162, which are connected to the output 158 of the comparator 78 and to the positive input 154 of comparator 78, form a hysteresis network to prevent oscillation in the switching supply as described above.

In a particularly preferred embodiment when the output on pin 158 of comparator 78 is logic zero, transistors 90 and 72 are off, and the voltage at comparator reference input pin 154 is 4.645 volts. When the output on pin 158 is a logic 1, transistors 90 and 72 are on, and the reference input on pin 154 is 5 volts providing a 0.355 volt hysteresis at the comparator 80. It also defines the amount of ripple that will be present on the high voltage output line 170. In the present case, the maximum ripple allowed is approximately 2½ volts for a 36–40 volt output. When the voltage on capacitor 92 is discharged, through some load, below approximately 34 volts, the voltage on the inverting input 150 of comparator 78 goes below that of the positive reference input 154, causing the comparator to switch to the high impedance state. This turns on transistor 90, turning on the transistor switch 72 and charging up the capacitor 92 again. This cycle repeats indefinitely, and this switching supply therefore operates in a fixed ripple voltage mode.

It should be noted that when transistor switch 72 shuts off, it will shut off rather abruptly causing an inductive spike from the transformer 26. Capacitor 44 helps to attenuate this spike. The turn-off time of transistor switch 72 determines the amplitude of the spike. To reduce the spike amplitude, the turn-off time must be lengthened. The turnoff time of transistor switch 72 is determined primarily by the combination of resistor 146 and capacitor 164 whose values are selected to provide a longer turn-off time than the transistor switch intrinsic turn-off time. This provides a lower dI/dt and a lower voltage transient from transformer 26 and therefore a lower voltage spike upon transistor switch 72. It is important to note that this transient protection prevents the breakdown of transistor switch 72 after it is turned off, thereby limiting the unnecessary power dissipation by the transistor switch. Capacitors 44 and 164 also minimize the electromagnetic interference which is coupled back to the power line through transformer 26. It should be noted that the transformer impedance, that is, its inductance and d.c. resistance, is used as voltage dropping element limiting the current through the transistor switch 72. The peak current handling characteristic (transformer saturation current) also limits the peak current through switch 72 to safe operational limits. The transformer 26 operates in a saturation mode while the secondary voltage is high. As the input voltage decreases, the transformer 26 begins to operate in a linear mode. Therefore, the transformer characteristics help limit the extra power which switch 72 would otherwise have to handle alone in accommodating the wide range of input voltages.

In a particularly preferred embodiment of the present invention, capacitors 92 and 164 are 220 microfarads and 470 picofarads, respectively. Resistors 74 and 146 are 11K ohms and 3000 ohms, respectively. Resistors 148 and 152 in the voltage divider supplying one input to comparator 78 are 22K ohms and 3.32K ohms, respectively.

The status circuit operates LED 102 and indicates whether the two primary output voltages on lines 170 and 140 are within a tolerance range. It is meant primarily as a gross indicator that the supply is operating properly. Undervoltage for the 8½ volt supply at output 140 is defined as 7 volts, and undervoltage for the 36–40 volt output at line 170 is defined as 33 volts. Overvoltage is defined as 10 volts for the 8½ volt supply, and 39 volts for the 36–40 volt supply. The circuit consisting of the resistors 172, 174 and 176 is a voltage divider and is used to set the overvolt detection threshold. The voltage divider 178 feeds inverting input pin 180 of overvoltage detecting comparator 82, and positive input pin 182 is connected to the 5-volt reference 86. To detect an overvoltage condition, the resistor equation for two simultaneous equations must be solved. That is, an overvoltage condition should be detected if the 8½ volt line is at 10 volts, and the 36–40 volt line 170 is at its nominal voltage; or if the 8½ volt line is at its nominal voltage and the 36–40 volt line goes to 39 volts. After substracting the 5-volt reference voltage from this, the equations read as follows: $5 \times R2 + 31 \times R1 = 5$ volts; $3.5 \times R2 + 34 \times R1 = 5$ volts. Taking the difference between these two equations yields $1.5 \times R2 - 3 \times R1 = 0$. Therefore, resistor 172 must be twice the resistance value of the resistor 174. If resistor 174 is arbitrarily set at 100K ohms, then resistor 172 must be 50K ohms. In order to meet the 5-volt necessity for comparison, resistor 176 must be 12.2K ohms. The same voltage divider feeds pin 184, the positive input of comparator 84, the undervoltage detector, whose inverting input 186 is driven by a voltage divider consisting of resistors 188 and 190. The total resistance of resistors 188 and 190 must be kept low enough so that the 5-volt reference 86 is loaded to at least one milliamp to stabilize the reference. Normally, the overvoltage input pin 180 is below the 5-volt reference, making the output pin 192 of the comparator 82 a high impedance which is connected in parallel with output pin 194 of the comparator 84. This is the output of the undervoltage detector. Normally, the undervolt positive input 184 which is fed by the voltage sense resistor divider 178 is higher than the divided down 5-volt reference from output 196 of reference 86, making the pin 194 a high impedance output allowing resistor 198 to drive transistor 100 on, and the LED 102 is on through resistor 104 in the 8½ volt output. However, if either an overvoltage is detected, that is, pin 180 goes higher than the 5-volt reference 86, the output of comparator 82 will switch on, i.e., go low, or if an undervoltage is detected, pin 194 will go low diverting the base drive for transistor 100 to ground. Transistor 100 then turns off the LED 102 and gives a fault indication to the user.

As will be appreciated by those skilled in the art, the present invention provides a power supply system capable of outputting a plurality of d.c. voltages from a single power input of any one of a variety of power sources of widely varying voltage and frequency.

What I claim as new and desire to secure by Letters Patent of the United States is:

1. A power supply circuit for providing a plurality of d.c. operating potentials of selected polarity and magnitude from an a.c. energy source comprising:
   input transformer means for receiving an a.c. voltage input and for converting said a.c. voltage input to an a.c. output voltage of lower value and for limiting output current level;
   first rectifier means for converting said lower a.c. voltage output to a unidirectional voltage waveform;
   first charge storage means for storing an electrical charge;
   first power switching means for receiving said unidirectional voltage waveform and providing a first controlled charging current to said first charge storage means;
   first load voltage output means connected to said first charge storage means for providing a first load output voltage from said first charge storage means to a first load;
   first load voltage sensing means for sensing the voltage level of said first load output voltage and providing a first proportional voltage signal proportional to said first load output voltage;
   reference voltage level means for providing a reference voltage level;
   first power switch control means for controlling the on-off state of said first power switching means dependent upon the relative values of said first proportional voltage signal and said reference voltage for controlling the ripple voltage of said first load output voltage;
   second charge storage means for storing an electrical charge;
   second power switching means connected electrically in series with said first load voltage output means for providing a second controlled charging current to said second charge storage means;
   impedance means connected in series between the output of said second power switching means and said second charge storage means for limiting the current level of said second charging current when said second power switching means is in the current conducting state;
   rectifier means having one terminal thereof connected to the junction between said second power switching means and said impedance means for providing a current conducting path through said impedance means when said second power switching means is in the non-conducting state;
   second load voltage output means connected to said second charge storage means for providing a second load output voltage to a second load;
   second load voltage sensing means for sensing the voltage level of said second load output voltage and providing a second proportional voltage signal proportional to said second load output voltage; and
   second power switch control means for controlling the on-off state of said second power switching means dependent upon the relative values of said second proportional voltage signal and said reference voltage for controlling the ripple voltage of said second load output voltage.

2. The invention of claim 1 wherein said first power switch control means comprises:
   first comparator means for comparing said sensed first load output voltage to said first reference voltage level and providing a first switching control signal; and
   first amplifier means for receiving said first switching control signal and providing a first switching rate control signal to said first power switching means to control the duty cycle of said first power switching means.

3. The invention of claim 2 further comprising:
   switch rate control means for controlling the turn-off time and turn-on time of said first power switching means.

4. The invention of claim 2 wherein said first load voltage sensing means comprises:
   first voltage divider means connected to the output of said first charge storage means for providing a reduced voltage proportional to said first load output voltage as said first proportional voltage signal as an input to said first comparator means.

5. The invention of claim 4 further comprising:
   first hysteresis means connected to the output of said first comparator means and to one input of said first comparator means for preventing oscillation of the first power switching means between conductive and nonconductive states.

6. The invention of claim 1 wherein said input transformer means comprises:
   a first primary winding means for receiving an a.c. voltage input having a voltage range such that the maximum voltage is at least twice the minimum and a frequency range such that the maximum frequency is at least five times the minimum frequency; and
   a first secondary winding means for providing a secondary voltage waveform having a voltage proportional to the voltage of said voltage input.

7. The invention of claim 6 wherein said first primary means comprises:
   a two tap primary winding having a first tap for receiving an a.c. input having a voltage range of 70 to 140 volts and a frequency range of 45 to 400 hertz; and having a second tap for receiving an a.c. input having a voltage range of 200 to 416 volts and a frequency range of 45 to 400 hertz.

8. The invention of claim 1 wherein said rectifier means further comprises:
   capacitor means connected across the input terminals of said first rectifier means to limit the rate of change of voltage at the time of actuation of said first power switching means.

9. The invention of claim 1 wherein said second load voltage sensing means comprises:
second voltage divider means connected to the output of said second charge storage means for providing a reduced voltage proportional to said second load output voltage as said second proportional voltage signal as an input to a second comparator means.

10. The invention of claim 9 further comprising:
second hysteresis means connected to the output of said second comparator means and to one input of said second comparator means for preventing oscillation of the second power switching means between conductive and nonconductive states.

11. The invention of claim 1 further comprising status circuit means comprising:
weighted voltage summing means for receiving said first proportional voltage signal and said second proportional voltage signal and providing a sum of said first and said second proportional voltage signals;
third comparator means for comparing said reference voltage to said sum and providing a first indicator output control signal dependent upon the relative values of said sum and said reference voltages and indicative of an overvoltage condition on at least one of said charge storage means;
fourth comparator means for comparing a voltage proportional to said reference voltage to said sum and providing a second indicator output control signal dependent upon the relative values of said sum and said reference voltages and indicative of an undervoltage condition on at least one of said charge storage means;
logical operator means for receiving said first or said second indicator output control signals and turning off whenever either of said first or second indicator output control signals is received; and
indicator means connected to said logical operator means for indicating whether said logical operator means is turned on or turned off.

12. The invention of claim 11 further comprising isolated power supply means comprising:
second transformer means having a second primary winding means connected to said first secondary winding means and a second secondary winding means coupled to said second primary winding for providing a step down output a.c. waveform;
second rectifier means for converting said step down output a.c. waveform to a unidirectional isolated voltage waveform; and
filter capacitor means connected in parallel with the series combination of said second secondary winding and said second rectifier means for limiting the ripple of said unidirectional isolated voltage waveform.

13. The invention of claim 1 wherein:
said first load output voltage comprises a d.c. output voltage in the range of 33–39 volts;
said second load output voltage comprises a d.c. output voltage in the range of 8.0–10 volts.

14. The invention of claim 1 wherein said impedance means comprises:
an inductor connected in series between the output of said second power switching means and said second charge storage means for limiting the current variation in the charging current supplied to said second charge storage means by said second power switching means; and
third rectifier means having one terminal thereof connected to system ground and the other terminal thereof connected to the junction point between said inductor and said second power switching means for removing transient voltage disturbances from said second power switching means and for providing a current discharge path for charge stored in said inductor.

15. A method of providing at least one operating potential of selected polarity and magnitude from an a.c. energy source comprising the steps of:
inputting an a.c. voltage waveform to an input transformer means of a power supply circuit;
converting said a.c. voltage waveform to an a.c. voltage waveform of a lesser voltage and a current level limited by said input transformer means;
rectifying said a.c. voltage waveform of a lesser voltage to a unidirectional voltage waveform;
supplying said unidirectional waveform to a first controlled power switching means;
controlling the switching duty cycle of said first power switching means to provide a charging current to a first charge storage capacitor with a limited voltage ripple;
providing a first unidirectional output voltage waveform from said first charge storage capacitor;
sensing said first unidirectional output voltage waveform and providing a first voltage signal proportional to said first output voltage waveform;
providing a reference voltage level;
comparing said first proporational voltage signal to said reference voltage level to generate switch control signals to control the duty cycle of said first power switching means to control charging of said first charge storage capacitor to maintain said first unidirectional output voltage waveform within a predetermined ripple voltage range;
supplying said first unidirectional output voltage waveform to a second controlled power switching means;
controlling the switching duty cycle of said second power switching means to provide a charging current to a second charge storage capacitor with a limited voltage ripple;
providing a second undirectional output voltage waveform from said second charge storage capacitor;
passing said charging current through inductor means to limit the current level of said charging current through said second charge storage capacitor when said second power switching means is in the conducting state and discharging said inductor means through rectifier means having one terminal thereof connected to the junction between said second power switching means and said inductor means to supply output current to said second load means when said second power switching means is in the nonconducting state;
sensing said second unidirectional output voltage waveform and providing a second voltage signal proportional to said second output voltage waveform; and
comparing said second proportional voltage signal to said reference voltage level to generate switch control signals to control the duty cycle of said second power switching means to control charging of said second charge storage capacitor to maintain said second unidirectional output voltage waveform within a predetermined ripple voltage range.

16. The invention of claim 15 wherein:
said first unidirectional output voltage comprises a limited ripple d.c. voltage in the range of 33–39 volts; and
said second unidirectional output voltage comprises a limited ripple d.c. voltage in the range of 8.0–10 volts.

* * * * *